United States Patent
Kim et al.

(10) Patent No.: US 11,134,387 B2
(45) Date of Patent: Sep. 28, 2021

(54) METHOD AND DEVICE FOR PROCESSING PACKET BY TERMINAL IN WIRELESS COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 16/343,682

(22) PCT Filed: Nov. 6, 2017

(86) PCT No.: PCT/KR2017/012479
§ 371 (c)(1),
(2) Date: Apr. 19, 2019

(87) PCT Pub. No.: WO2018/084668
PCT Pub. Date: May 11, 2018

(65) Prior Publication Data
US 2019/0245800 A1  Aug. 8, 2019

(30) Foreign Application Priority Data
Nov. 4, 2016 (KR) .......................... 10-2016-0146355

(51) Int. Cl.
*H04W 12/08* (2021.01)
*H04W 12/10* (2021.01)
(Continued)

(52) U.S. Cl.
CPC .......... *H04W 12/106* (2021.01); *H04L 47/34* (2013.01); *H04W 12/03* (2021.01); *H04W 12/08* (2013.01);
(Continued)

(58) Field of Classification Search
CPC ..... H04W 76/15; H04W 80/02; H04W 76/11; H04W 76/19; H04W 12/04;
(Continued)

(56) References Cited

U.S. PATENT DOCUMENTS 10,531,320 B2 * 1/2020 Yi .......................... H04W 24/08
2014/0098797 A1 4/2014 Kanamarlapudi et al.
(Continued)

FOREIGN PATENT DOCUMENTS

KR 10-2015-0124873 A 11/2015
KR 10-2016-0025831 A 3/2016

OTHER PUBLICATIONS

Nokia, 'Addition of COUNT determination for the purpose of HRW setting', R2-164903, 3GPP TSG-RAN WG2 Meeting #95, Aug. 12, 2016.
(Continued)

*Primary Examiner* — Jae Y Lee
*Assistant Examiner* — Aixa A Guadalupe Cruz
(74) *Attorney, Agent, or Firm* — Jefferson IP Law, LLP

(57) ABSTRACT

The present disclosure relates to a communication technique for convergence of a 5G communication system for supporting a higher data transmission rate beyond a 4G system with an IoT technology, and a system therefor. The present disclosure may be applied to an intelligent service (for example, smart home, smart building, smart city, smart car or connected car, health care, digital education, retail business, security and safety-related service, etc.) based on a 5G communication technology and an IoT-related technology. The present invention provides a method for processing a packet by a terminal, the method comprising the steps of: receiving configuration information for packet processing from a base station; determining a count value for processing a packet to be transmitted to the base station, based on
(Continued)

the configuration information; and processing the packet based on the determined count value, wherein the length of the count value is the same as the length of a packet data convergence protocol sequence number (PDCP SN) of the terminal.

13 Claims, 15 Drawing Sheets

(51) Int. Cl.
*H04W 12/106* (2021.01)
*H04L 12/801* (2013.01)
*H04W 76/28* (2018.01)
*H04W 28/06* (2009.01)
*H04W 12/03* (2021.01)
*H04W 84/04* (2009.01)

(52) U.S. Cl.
CPC ........... *H04W 12/10* (2013.01); *H04W 28/06* (2013.01); *H04W 76/28* (2018.02); *H04W 84/042* (2013.01)

(58) Field of Classification Search
CPC ..... H04W 36/0085; H04W 4/50; H04W 4/70; H04W 84/18; H04W 48/16; H04W 56/0045; H04W 80/08; H04W 4/40; H04W 8/30; H04L 67/104; H04L 2463/061; H04L 63/06; H04L 63/068; H04L 63/1416; H04L 63/1441; H04L 29/08306; H04L 1/1642; H04L 47/34; H04L 9/0819; H04L 9/14

See application file for complete search history.

(56) References Cited

U.S. PATENT DOCUMENTS

| | | |
|---|---|---|
| 2014/0294179 A1 | 10/2014 | Sammour et al. |
| 2015/0215825 A1* | 7/2015 | Kim ................. H04W 36/0088 370/331 |
| 2016/0066203 A1 | 3/2016 | Yoon |
| 2016/0366175 A1* | 12/2016 | Basu Mallick ....... H04W 76/19 |

OTHER PUBLICATIONS

Nokia Networks, 'PDCP Status PDU with PDCP SN extension', R2-154593, 3GPP TSG-RAN WG2 Meeting #91bis, Sep. 25, 2015.

* cited by examiner

METHOD AND DEVICE FOR PROCESSING PACKET BY TERMINAL IN WIRELESS COMMUNICATION SYSTEM

TECHNICAL FIELD

The disclosure relates to a method and apparatus for effectively performing a PDCP operation and a DRX operation in a next generation mobile communication system.

BACKGROUND ART

In order to meet wireless data traffic demands that have increased after the commercialization of the 4G communication system, efforts to develop an improved 5G communication system or a pre-5G communication system have been made. For this reason, the 5G communication system or the pre-5G communication system is called a beyond 4G network communication system or a post-LTE system. In order to achieve a high data transmission rate, implementation of the 5G communication system in an ultrahigh frequency (mmWave) band (e.g., 60 GHz band) is being considered. In the 5G communication system, technologies, such as beamforming, massive MIMO, Full Dimensional MIMO (FD-MIMO), array antenna, analog beam-forming, and large scale antenna technologies, are being discussed as means to mitigate propagation path loss in the ultrahigh frequency band and increase a propagation transmission distance. Further, in the 5G communication system, technologies such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation, have been developed to improve the system network. In addition, in the 5G system, advanced coding modulation (ACM) schemes such as hybrid FSK and QAM modulation (FQAM) and sliding window superposition coding (SWSC), and advanced access technologies such as filter bank multi carrier (FBMC), non orthogonal multiple access (NOMA), and sparse code multiple access (SCMA) have been developed.

Meanwhile, the Internet has been evolved to an Internet of Things (IoT) network in which distributed components, such as objects, exchange and process information from a human-oriented connection network in which humans produce and consume information. An Internet of Everything (IoE) technology has emerged in which a big data processing technology via a connection with a cloud server or the like is combined with the IoT technology. In order to implement IoT, technical factors such as a sensing technique, wired/wireless communication and network infrastructures, service-interface technology, and security technology are required, and research on technologies such as a sensor network, machine-to-machine (M2M) communication, machine-type communication (MTC), and the like for connection between objects has recently been conducted. In an IoT environment, via collection and analysis of data produced from connected objects, an intelligent Internet Technology (IT) service to create new value for peoples' lives may be provided. The IoT may be applied to fields such as smart homes, smart buildings, smart cities, smart cars, connected cars, smart grids, health care, smart home appliances, or high-tech medical services via the convergence of the conventional information technology (IT) and various industries.

Accordingly, various attempts to apply the 5G communication system to the IoT network are made. For example, 5G communication technologies such as a sensor network, machine to machine (M2M) communication, machine type communication (MTC), and the like are implemented by the schemes such as beamforming, MIMO, array antenna, and the like. The application of a cloud RAN as the big data processing technology may be an example of convergence of the 5G technology and the IoT technology.

DISCLOSURE OF INVENTION

Technical Problem

Therefore, the disclosure has been made in view of the above-mentioned problems, and an aspect of the disclosure is to provide a method and apparatus for determining which one of a PDCP SN and a combination of an HFN and a PDCP SN is to be used as a count value (COUNT) for each logical channel, and changing the length of the count value for each logical channel.

Solution to Problem

In accordance with an aspect of the disclosure, a method of processing a packet by a terminal may include: receiving configuration information for packet processing from a base station; determining a count value (COUNT) for processing a packet to be transmitted to the base station, based on the configuration information; and processing the packet based on the determined COUNT, wherein a length of the count value is the same as a length of a packet data convergence protocol sequence number (PDCP SN) of the terminal.

The operation of determining the count value may include determining a first count value or a second count value as the count value for processing the packet, based on the configuration information, wherein a length of the first count value is the same as a length of a PDCP SN of the terminal, and a length of the second count value is longer than the length of the PDCP SN of the terminal.

The second count value may be determined based on the PDCP SN of the terminal and a hyper frame number (HFN) of the terminal.

The configuration information may include information associated with a logical channel of the packet, and the operation of determining the count value may include determining the first count value or the second count value as the count value for processing the packet, based on the information associated with the logical channel of the packet.

The operation of determining the count value may include determining the first count value as the count value for processing the packet when a size of the packet exceeds a predetermined reference value, and determining the second count value as the count value for processing the packet when the size of the packet is less than or equal to the reference value.

The operation of processing the packet may include performing an integrity protection operation for the packet and ciphering the packet, based on the count value.

In accordance with another aspect of the disclosure, provided a method of processing a packet by a terminal may include: receiving a packet and configuration information for packet processing from a base station; determining a count value (COUNT) for processing the packet based on the configuration information; and processing the packet based on the determined count value, wherein a length of the count value is the same as a length of a packet data convergence protocol sequence number (PDCP SN) of the terminal.

The operation of determining the count value may include determining a first count value or a second count value as the count value for processing the packet, based on the configuration information, a length of the first count value is the same as a length of a PDCP SN of the terminal, and a length of the second count value is longer than the length of the PDCP SN of the terminal.

The operation of processing the packet may include performing an integrity verification operation for the packet and deciphering the packet, based on the count value.

In accordance with another aspect of the disclosure, a terminal may include: a transceiver configured to transmit and receive a signal; and a controller configured to control the transceiver to receive, from a base station, configuration information for packet processing, to determine a count value (COUNT) for processing a packet to be transmitted to the base station based on the configuration information, and to process the packet based on the determined count value, wherein a length of the count value is the same as a length of a packet data convergence protocol sequence number (PDCP SN) of the terminal.

The controller may determine a first count value or a second count value as the count value for processing the packet, based on the configuration information, wherein a length of the first count value is the same as a length of a PDCP SN of the terminal and a length of the second count value is longer than the length of the PDCP SN of the terminal.

The configuration information may include information associated with a logical channel of the packet, and the controller may determine the first count value or the second count value as the count value for processing the packet, based on the information associated with a logical channel of the packet.

The controller may determine the first count value as the count value for processing the packet when a size of the packet exceeds a predetermined reference value, and may determine the second count value as the count value for processing the packet when a size of the packet is less than or equal to the reference value.

In accordance with an aspect of the disclosure, a terminal may include: a transceiver configured to transmit and receive a signal; and a controller configured to control the transceiver so as to receive a packet and configuration information for packet processing from a base station, to determine a count value (COUNT) for processing the packet based on the configuration information, and to process the packet based on the determined count value, wherein a length of the count value is the same as a length of a packet data convergence protocol sequence number (PDCP SN) of the terminal.

The controller may determine the first count value or the second count value as the count value for processing the packet based on the configuration information, and a length of the first count value may be the same as a length of a PDCP SN of the terminal, and a length of the second count value may be longer than the length of the PDCP SN of the terminal.

Advantageous Effects of Invention

According to an embodiment of the disclosure, a PDCP operation and a DRX operation may be efficiently performed in a next generation mobile communication system.

MODE FOR THE INVENTION

Figure 1:
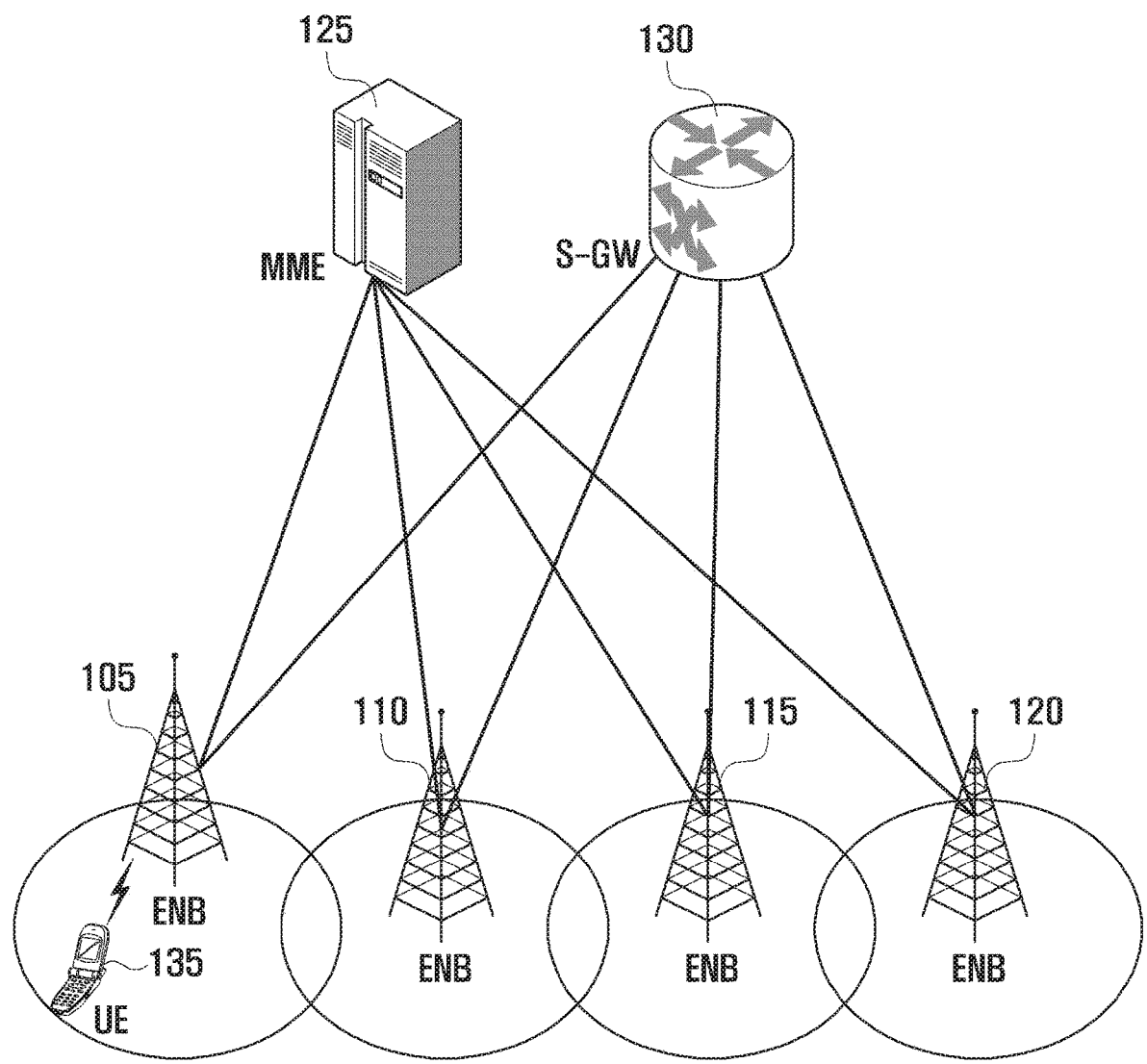
FIG. 1 is a diagram illustrating the structure of a legacy LTE system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The disclosure relates to a method and apparatus for effectively performing a PDCP operation and a DRX operation in a next generation mobile communication system.

The legacy LTE system will be briefly described before the disclosure is described.

FIG. 1 is a diagram illustrating the structure of the legacy LTE system.

Referring to FIG. 1, as illustrated in the drawings, a radio access network of an LTE system is configured with next generation base stations (an evolved node B (ENB), a Node B, or a base station) 105, 110, 115, and 120, a mobility management entity (MME) 125, and a serving-gateway (S-GW) 130. A user equipment (UE) (or a terminal) 135 accesses an external network via the ENB 105 to 120, and the S-GW 130.

In FIG. 1, the ENB 105 to 120 corresponds to a legacy node B in a UMTS system. The ENB 105 to 120 is connected with the UE 135 via a wireless channel, and performs a more complicated role than the legacy node B. In the LTE system, real-time services, such as a voice over IP (VoIP) via an Internet protocol, and all user traffic are provided via a shared channel. Accordingly, there is a desire for a device that performs scheduling by collecting state information of UEs, such as a buffer state, an available transmission power state, a channel state, and the like, and the ENB 105 to 120 may be in charge of scheduling.

One ENB generally controls a plurality of cells. In order to implement a transmission rate of 100 Mbps, the LTE system uses an orthogonal frequency division multiplexing (OFDM) as a wireless access technology in a bandwidth of 20 MHz. Also, an adaptive modulation & coding (AMC) scheme that determines a modulation scheme and a channel coding rate may be applied based on the channel state of a UE.

The S-GW 130 is a device for providing a data bearer, and produces or removes a data bearer under the control of the MME 125. The MME 125 is a device that is in charge of various control functions in addition to a mobility management function associated with a UE, and may be connected to a plurality of ENBs.

Figure 2:
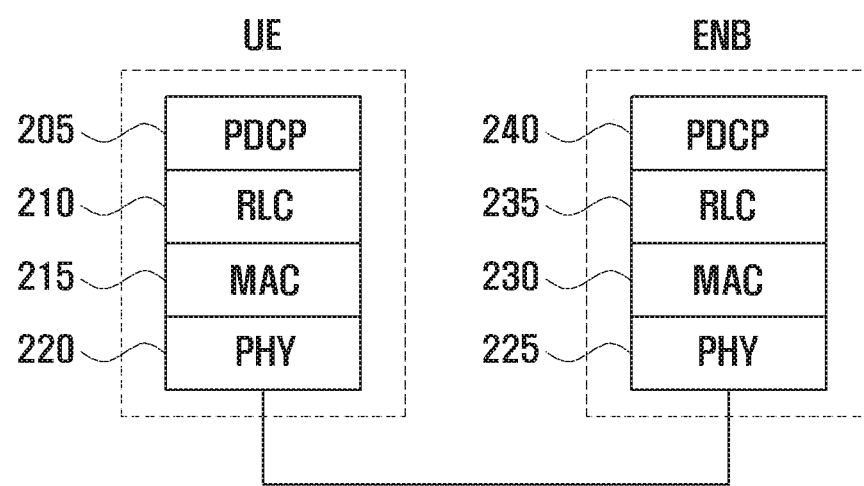
FIG. 2 is a diagram illustrating the structure of a wireless protocol in the legacy LTE system.

FIG. 2 is a diagram illustrating the structure of a wireless protocol in the legacy LTE system.

Referring to FIG. 2, the wireless protocol of the LTE system includes a packet data convergence protocol (PDCP) 205 and 240, a radio link control (RLC) 210 and 235, a medium access control (MAC) 215 and 230 for each of a UE and an ENB. A packet data convergence protocol (PDCP) 205 and 240 is in charge of an IP header compression/decompression operation or the like, and a radio link control (RLC) 210 and 235 reconfigures a PDCP packet data unit (PDCP PDU) to have an appropriate size, and performs an ARQ operation. The MAC 215 and 230 is connected with various RLC layer devices configured for one UE, and performs a multiplexing of RLC PDUs to MAC PDU and a demultiplexing of the RLC PDUs from the MAC PDU. The PHY layer 220 and 225 performs an operation of channel-coding and modulating higher layer data to produce an OFDM symbol and transmitting the OFDM symbol to a wireless channel, or demodulating and channel-decoding an OFDM symbol received via a wireless channel and transmitting the demodulated and channel-decoded OFDM symbol to a higher layer.

First Embodiment

In the first embodiment, a method of performing ciphering and integrity protection using a PDCP SN according to the feature of a logical channel will be provided.

Figure 3:
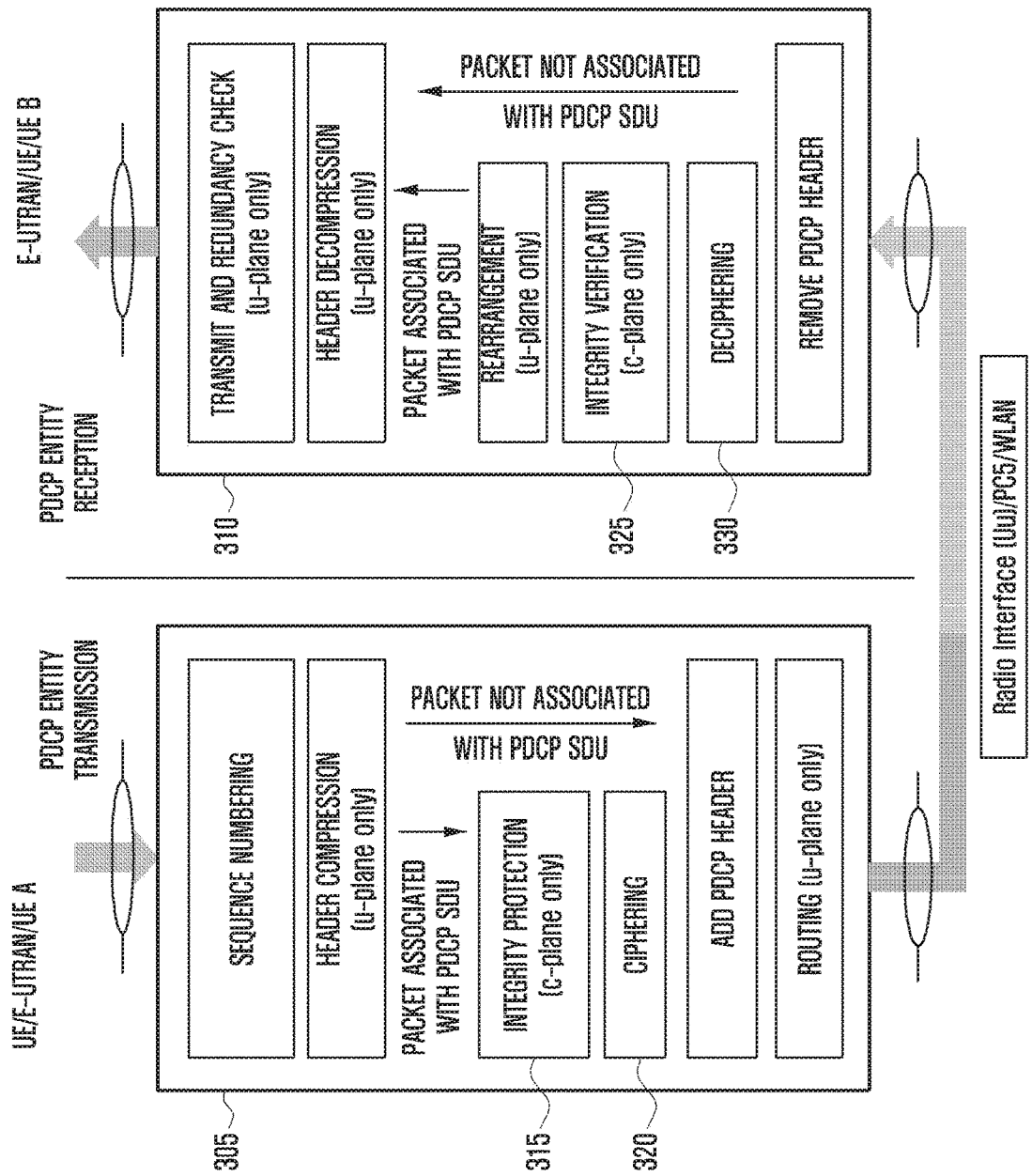
FIG. 3 is a diagram illustrating a PDCP layer in the legacy LTE system.

FIG. 3 is a diagram illustrating a PDCP layer in the legacy LTE system.

A transmission side 305 of the PDCP layer of the legacy LTE system may perform header compression, integrity protection 315, and ciphering 320. Conversely, a reception side 310 of the PDCP layer may perform header decompression, integrity verification 325, and deciphering 330. Here, integrity protection is used to determine whether a corresponding PDCP PDU is contaminated by someone. Ciphering is to encode the corresponding PDCP PDU such that the corresponding PDCP PDU is not recognized by others.

Figure 4:
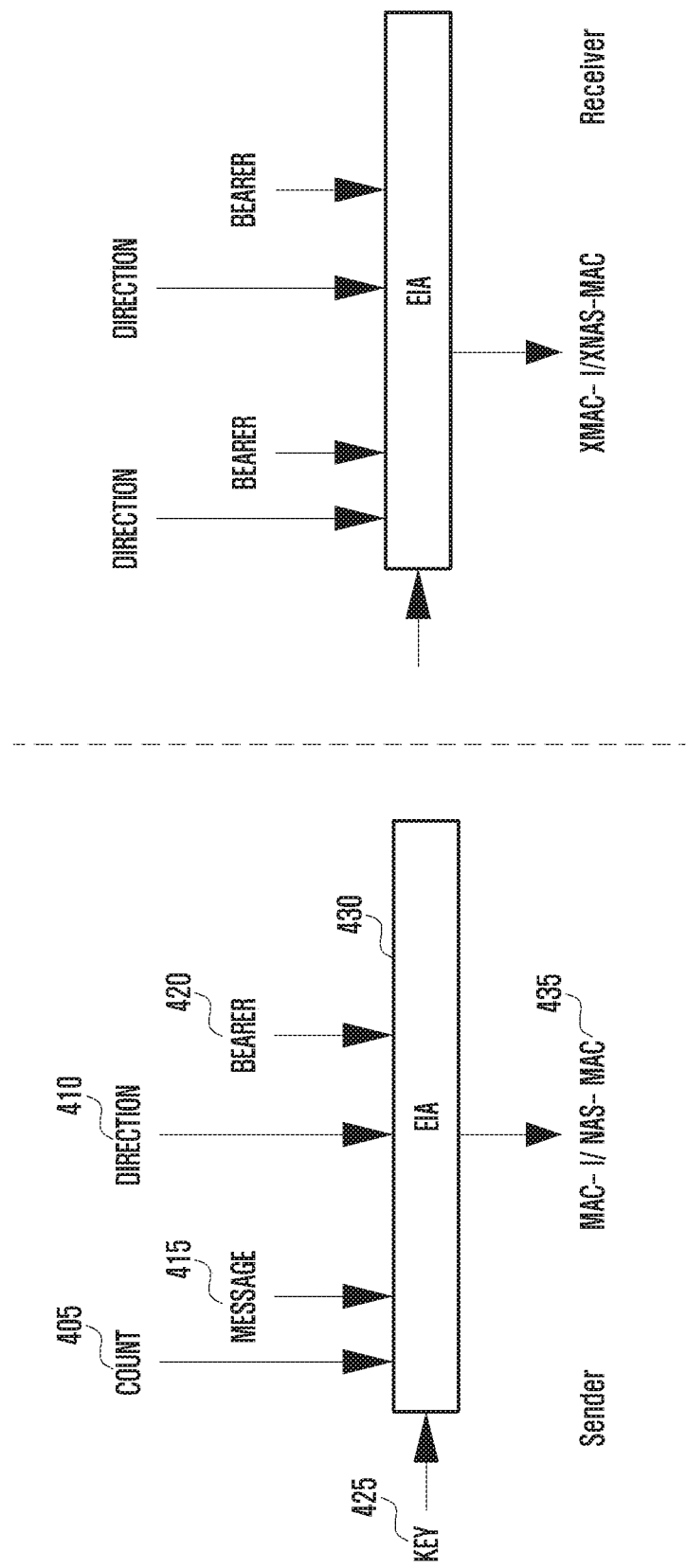
FIG. 4 is a diagram illustrating an integrity protection process performed in the legacy PDCP layer.

FIG. 4 is a diagram illustrating an integrity protection process performed in the legacy PDCP layer.

A transmitting device obtains a MAC by inputting, into a device including a predetermined security algorithm, a predetermined key 425, predetermined parameters, and a message 415 to which integrity protection is applied. The predetermined parameters may include a COUNT 405, a DIRECTION 410, a BEARER 420, and the like. The COUNT is a parameter obtained from a NAS serial number, the DIRECTION is a parameter determined based on a reverse direction/forward direction. The BEARER is a predetermined value indicating a radio bearer ID.

Figure 5:
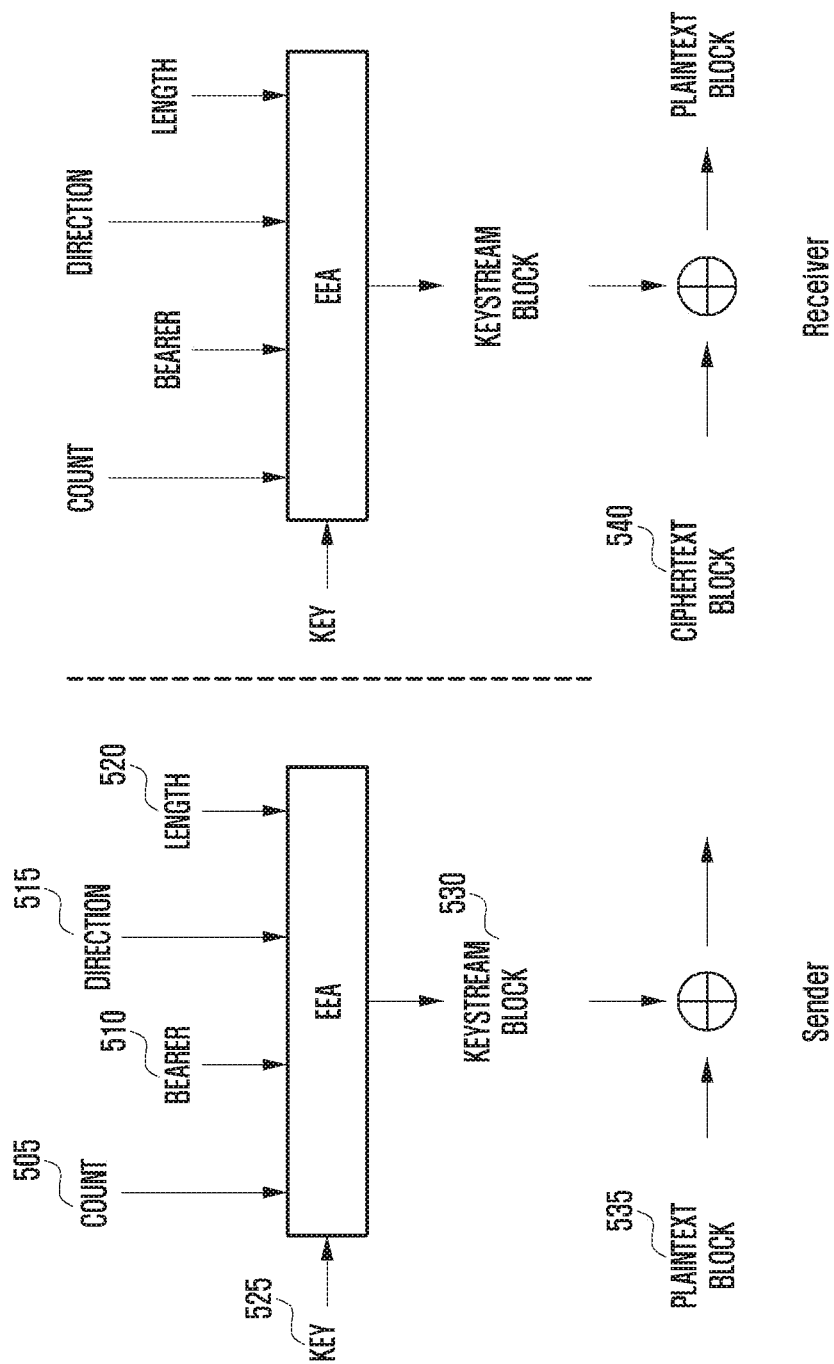
FIG. 5 is a diagram illustrating a ciphering process performed in the legacy PDCP layer.

FIG. 5 is a diagram illustrating a ciphering process performed in the legacy PDCP layer.

Ciphering is completed by applying a predetermined operation (e.g., an exclusive OR operation) to a KEY-STREAM BLOCK 530 which has the same length as that of a bit stream (a PLAINTEXT 535) to which ciphering is applied. The KEYSTREAM BLOCK is produced by a predetermined key, a predetermined algorithm, and predetermined parameters, and the predetermined parameters may be a COUNT 505, a BEARER 510, a DIRECTION 515, an LENGTH 520, and the like. The LENGTH is a parameter indicating the length of the PLAINTEXT/KEYSTREAM BLOCK. Deciphering is completed by applying a predetermined operation to the KEY STREAM BLOCK and CIPHERTEXT BLOCK, which are produced using the same key, the same algorithm, and the same parameter that are applied to ciphering.

Figure 6:
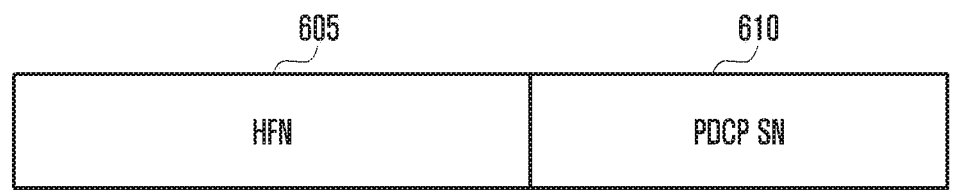
FIG. 6 is a diagram illustrating a COUNT format used in ciphering and integrity protection.

FIG. 6 is a diagram illustrating a COUNT format used in ciphering and integrity protection. A COUNT is 32 bits, and includes an HFN 605 and a PDCP SN 610. The size of a PDCH SN is variable, and is configured by a higher layer. That is, a PDCP SN is provided in one of the various sizes as shown in Table 1.

TABLE 1

| Length | Description |
| --- | --- |
| 5 | SRBs |
| 7 | DRBs, if configured by upper layers |
| 12 | DRBs, if configured by upper layers |
| 15 | DRBs, if configured by upper layers |
| 16 | SLRBs |
| 18 | DRBs, if configured by upper layers |

A HFN is a local value that a PDCP transmission side updates autonomously, and the size is calculated to be 32—the length of a PDCP SN. The PDCP transmission side obtains a COUNT by adding the HFN that the PDCP transmitting side autonomously manages and the PDCP SN, and performs ciphering and integrity protection for a PDCP SDU. The PDCP transmission side may include the PDCP SN in a PDCP header and may transmit the same. The PDCP reception side may obtain a COUNT by combining a PDCP SN included in the PDCP header and a HFN that the PDCP reception side autonomously manages. The PDCP reception side performs deciphering and integrity verification for a PDCP PDU. Every time that COUNT is warp-around, the PDCP transmission side and the PDCP reception side need to update a security key. To this end, handover is needed.

To this end, the PDCP transmission side and the PDCP reception side separately manage and update their own HFNs, so as to reduce an amount of header overhead generated when the PDCP transmission side and the PDCP reception side perform transmission and reception. In the disclosure, the above-described legacy method is referred to as a second method. Sometimes, the HFNs that the PDCP transmission side and the PDCP reception side separately obtain may not be synchronized. In order to overcome the complexity of the process of obtaining a HFN and asynchronous HFNs, a method of configuring a COUNT with only a PDCP SN, excluding a HFN may be used. That is, a COUNT and a PDCP SN may be identical to each other. In the disclosure, the proposed method may be referred to as a first method.

However, the first method is not suitable for VoIP or a radio bearer (SRB) which corresponds to signaling of a small packet. Generally, the size of a PDCP header is approximately 4 bytes. However, the size of the packet is approximately 1 byte, and a packet overhead ratio is significantly high. Therefore, the second method, which uses a COUNT including an HFN and a PDCP SN, is suitable for a packet having a small size.

Therefore, the disclosure has a feature of determining which one of a PSCP SN and a combination of a HFN and a PDCP SN is to be used as a COUNT for each logical channel. Also, the disclosure has a feature of changing the length of the COUNT for each logical channel. For example, a wrap-around cycle and an estimated time for each length of a COUNT are listed as shown in Table 2. For example, when a 8-bit COUNT is applied, handover needs to be performed to update a security key every 256 packets. When it is assumed that a packet is produced every 20 ms (as for VoIP), handover needs to be performed every 256×20 (ms) =5.12 seconds.

TABLE 2

|  | 8 bit | 12 bit | 16 bit | 24 bit | 32 bit |
| --- | --- | --- | --- | --- | --- |
| Wrap-around cycle (packet) | 256 | 4096 | 65536 | 16,777,216 | 4,294,967,296 |
| Estimated time (VoIP, produce packet every 20 ms) | 5.12 secs. | 81.12 secs. | 1310 secs. | 93 hrs. | 994 days |

Figure 7:
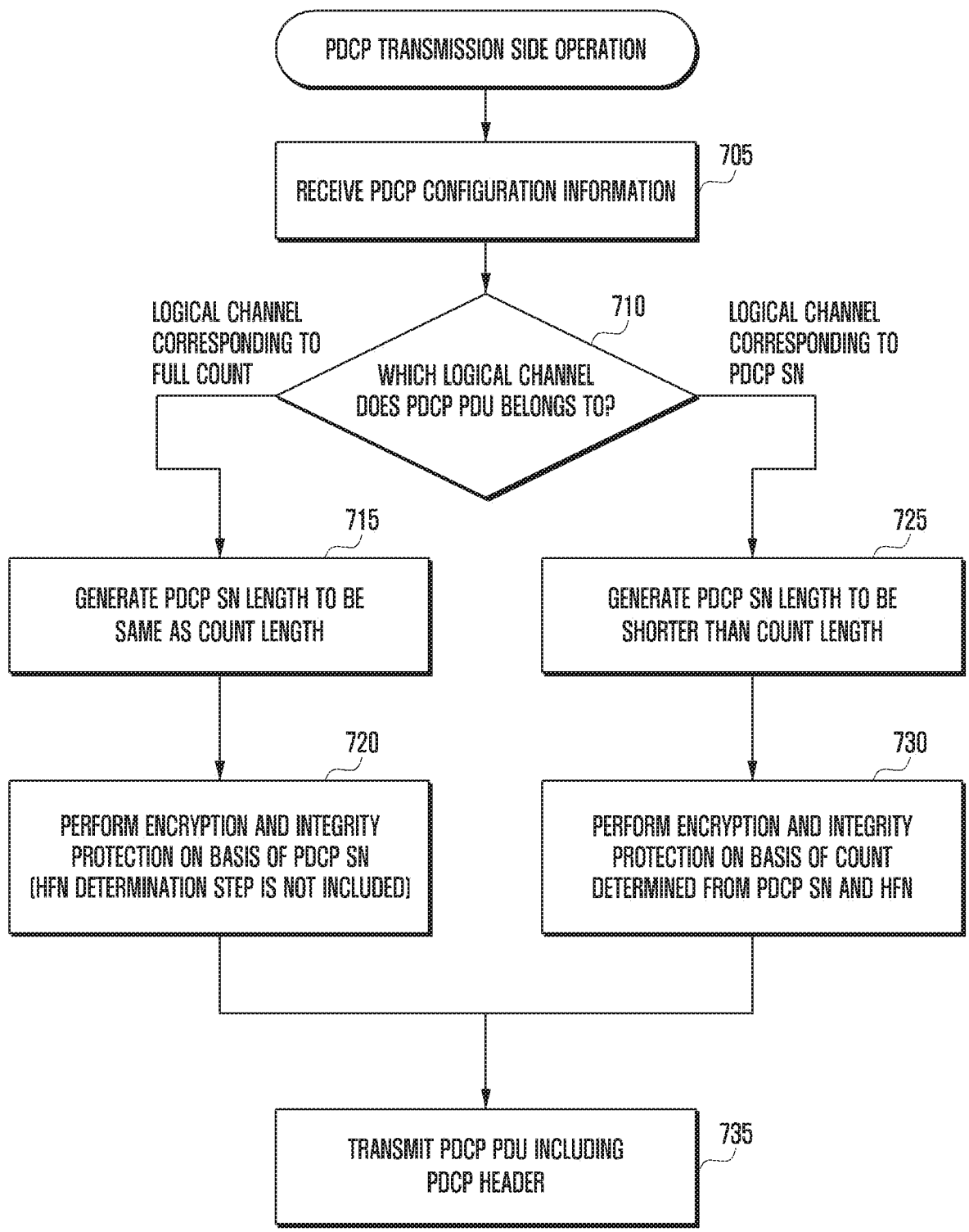
FIG. 7 is a diagram illustrating a process of performing ciphering and integrity protection by a PDCP transmission side in the disclosure.

FIG. 7 is a diagram illustrating a process of performing ciphering and integrity protection by a PDCP transmission side in the disclosure. A PDCP transmission side of a terminal receives, from a network, configuration information related to a type of logical channel to which the first method is applied and the length of a COUNT, in operation 705. When it is identified that a logical channel corresponding to a PDCP PDU to be transmitted is a logical channel that requires the first method, based on the configuration information, a PDCP SN is produced to have a size identical to the length of the COUNT configured in a PDCP header of the PDCP PDU, in operation 715. Ciphering and integrity protection are performed using the PDCP SN as the COUNT in operation 720. Otherwise, a PDCP SN that is smaller than the length of the COUNT is produced in operation 725. The COUNT is obtained by combining the produced PDCP SN and an HFN that the PDCP transmission side manages, and ciphering and integrity protection are performed using the same, in operation 730. The configured PDCP header is included in the PDCP PDU, and the PDCP PDU is transmitted to a PDCP reception side in operation 735.

Figure 8:
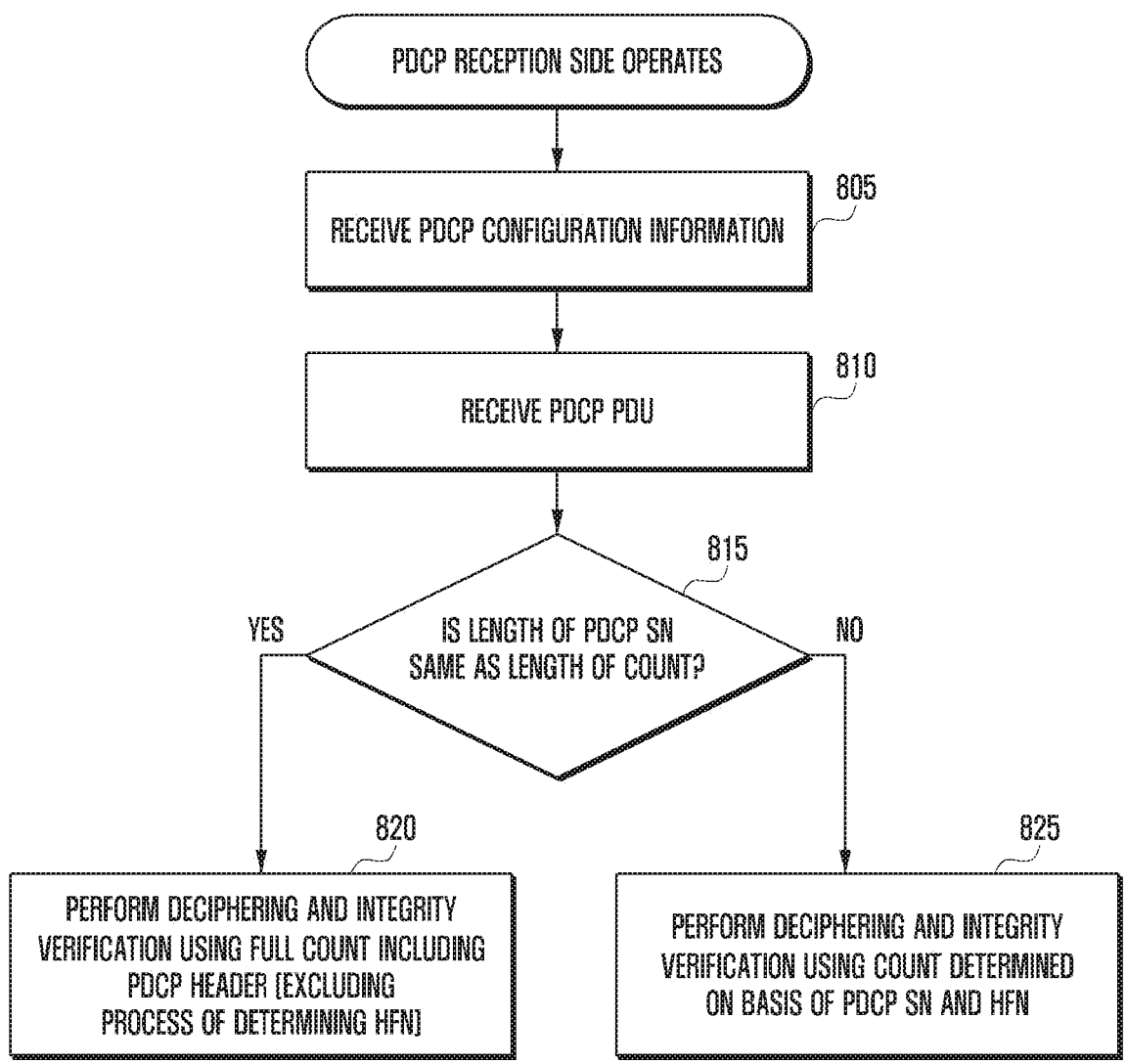
FIG. 8 is a diagram illustrating a process of performing deciphering and integrity verification by a PDCP reception side in the disclosure.

FIG. 8 is a diagram illustrating a process of performing deciphering and integrity verification by a PDCP reception side in the disclosure. A PDCP transmission side of a terminal may receive, from a network, configuration information related to the length of a COUNT for each logical channel in operation 805. The PDCP reception side of the terminal receives a single PDCP PDU in operation 810.

Whether the length of a PDCP SN included in a PDCP header of the received PDCP PDU is identical to the configured COUNT length is determined in operation 815. When they are identical to each other, deciphering and integrity verification are performed by regarding the received PDCP SN as a COUNT according to the first method in operation 820. Otherwise, a COUNT is obtained by combining the received PDCP SN and an HFN that the PDCP reception side manages, according to the second method, and deciphering and integrity verification are performed using the same in operation 825.

Second Embodiment

The second embodiment proposes the operation of a terminal when three or more DRX cycles are applied.

Figure 9:
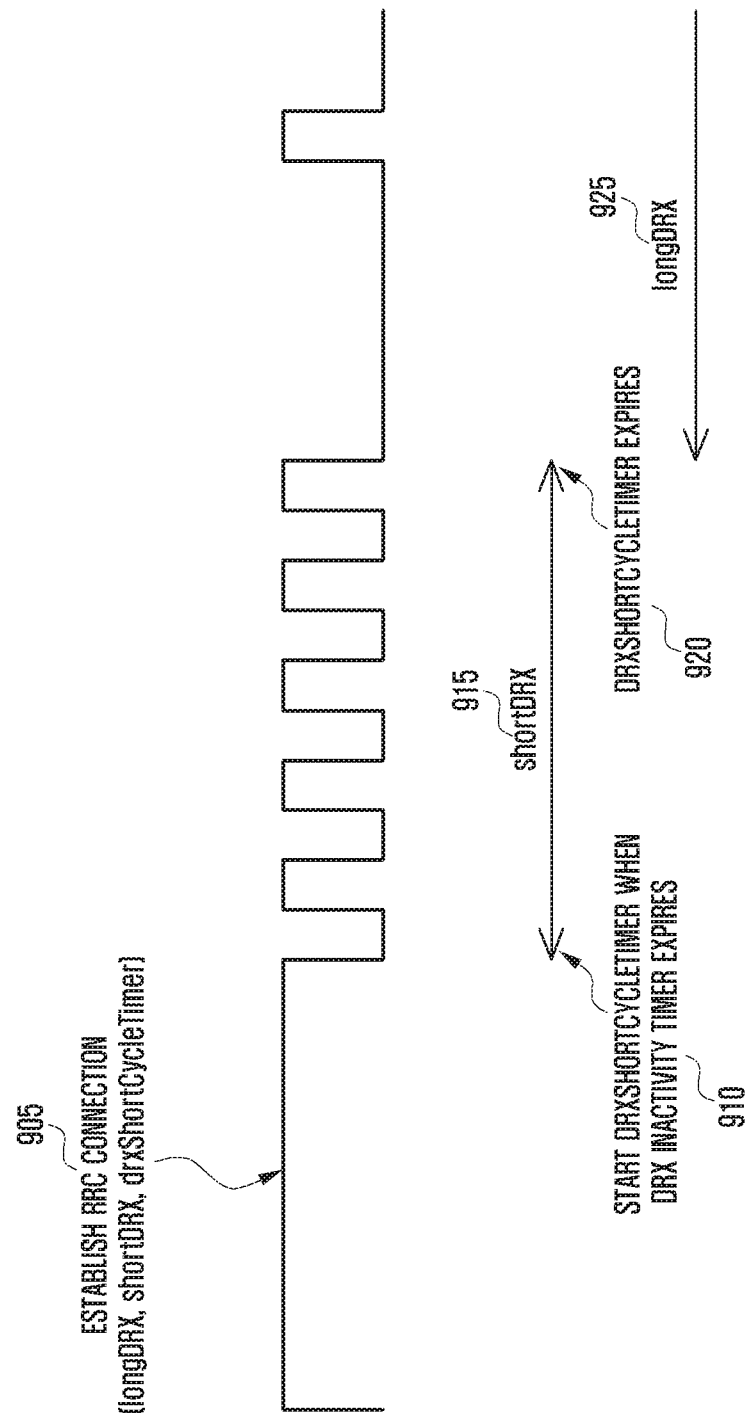
FIG. 9 is a diagram illustrating an operation in which two DRX cycles are applied after a drx-inactivity timer expires.

FIG. 9 is a diagram illustrating an operation in which two DRX cycles are applied after a drx-inactivity timer expires. A network provides DRX configuration information to a terminal using an RRC connection reconfiguration message. The DRX configuration information may include two DRX cycles and a single DRX timer, drxShortCycleTimer, in operation 905.

Among the DRX cycles, a short cycle is referred to as a short DRX cycle, and a long cycle is referred to as a long DRX cycle. When data transmission and reception is scheduled for the terminal, a drx-inactivity timer operates. When the timer expires, the drxShortCycleTimer starts in operation 910. While the drxShortCycleTimer operates, the terminal applies a short DRX cycle in operation 915. When the drxShortCycleTimer expires, a long DRX cycle is applied in operation 925.

Figure 10:
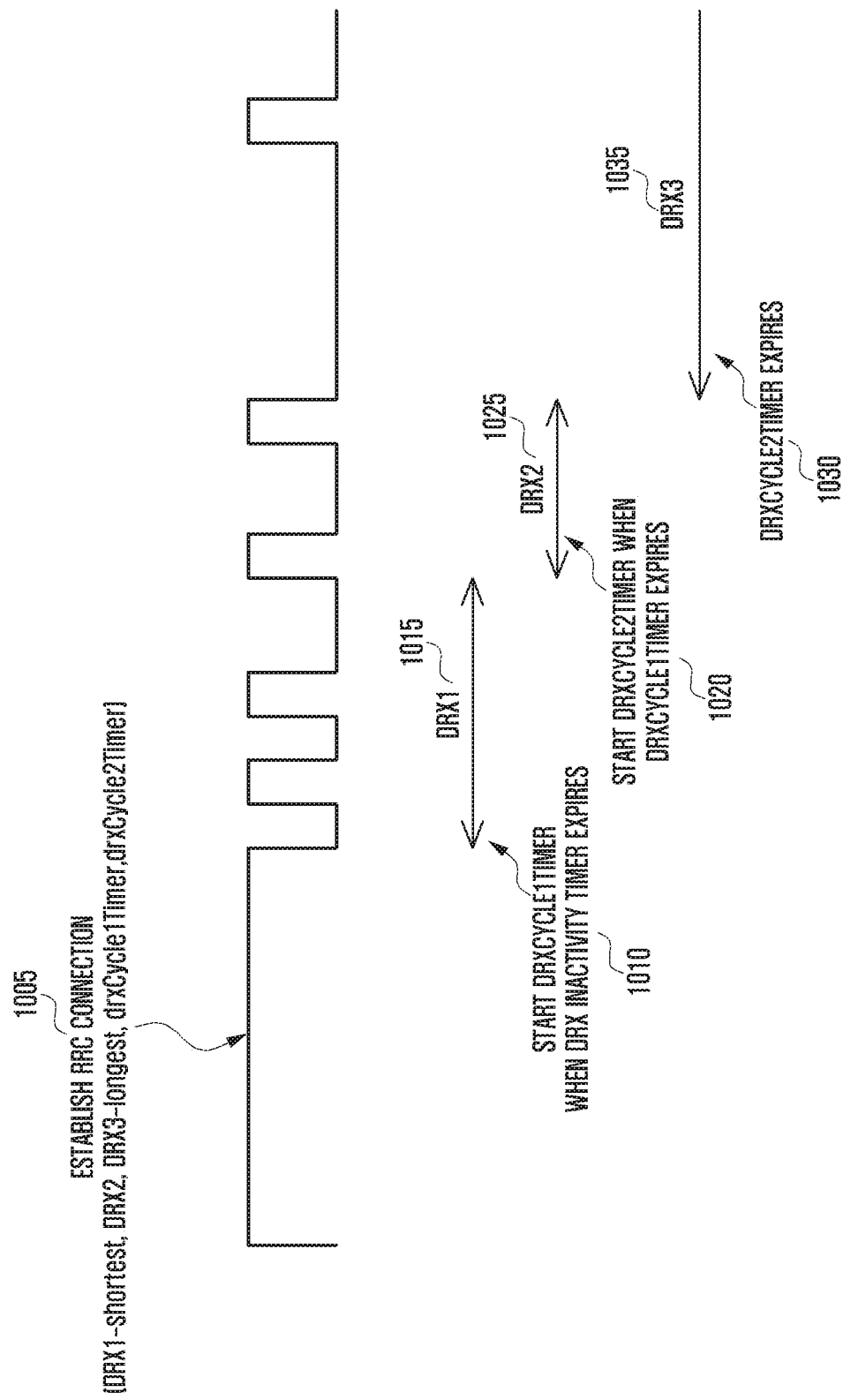
FIG. 10 is a diagram illustrating an operation in which a plurality of DRX cycles is applied after a drx-inactivity timer expires.

FIG. 10 is a diagram illustrating an operation in which a plurality of DRX cycles is applied after a drx-inactivity timer expires. A network provides DRX configuration information to a terminal using an RRC connection reconfiguration message. The DRX configuration information may include three or more DRX cycles, and a plurality of DRX timers respectively corresponding to DRX cycles, excluding the shortest DRX cycle, drxCycle[N]Timer, in operation 1005. Here, N is the number of DRX cycles, which is configured in advance.

Among the configured N DRX cycles, DRX cycle 1 indicates the shortest DRX cycle, and the DRX cycle N indicates the longest DRX cycle. The plurality of timers, drxCycle[N]Timer, need to be effectively signaled. Therefore, the following signaling method may be used.

drxCycle1Timer=drx cycle 1*$K$ drxCycle2Timer=drx cycle 2*$K$ drxCycle3Timer=drx cycle 3*$K$ That is, each DRX cycle may be represented by performing scaling using K.
Or drxCycle1Timer=common drx cycle*$L1$ drxCycle2Timer=common drx cycle*$L2$ drxCycle3Timer=common drx cycle*$L3$ That is, each DRX cycle may be represented by performing scaling using L1, L2, and L3 separately based on a common DRX cycle.

When data transmission and reception is scheduled for the terminal, a drx-inactivity timer operates. When the timer expires, a drxCycle1Timer corresponding to DRX cycle 1, which has the shortest cycle, may start in operation 1010. While the drxCycle1Timer operates, the terminal applies the DRX cycle 1 in operation 1015. Since bust data traffic may occur, the shortest DRX cycle is applied first.

That is, it is not long after the drx-inactivity timer expires, which starts when data transmission and reception is performed, and thus, there is high probability that data transmission and reception is newly scheduled. When the drxCycle1 Timer expires, a drxCycle2Timer starts, and DRX cycle 2, which is the second shortest cycle, is applied in operation 1025. The operation is repeated until the longest DRX cycle is applied. When each DRX cycle is applied, the start point of an onDurationTimer may be as given in the equation below.

[(*SFN*\*10)+subframe number]modulo(DRX-Cycle *n*)=(drxStartOffset)modulo(DRX-Cycle *n*)

Figure 11:
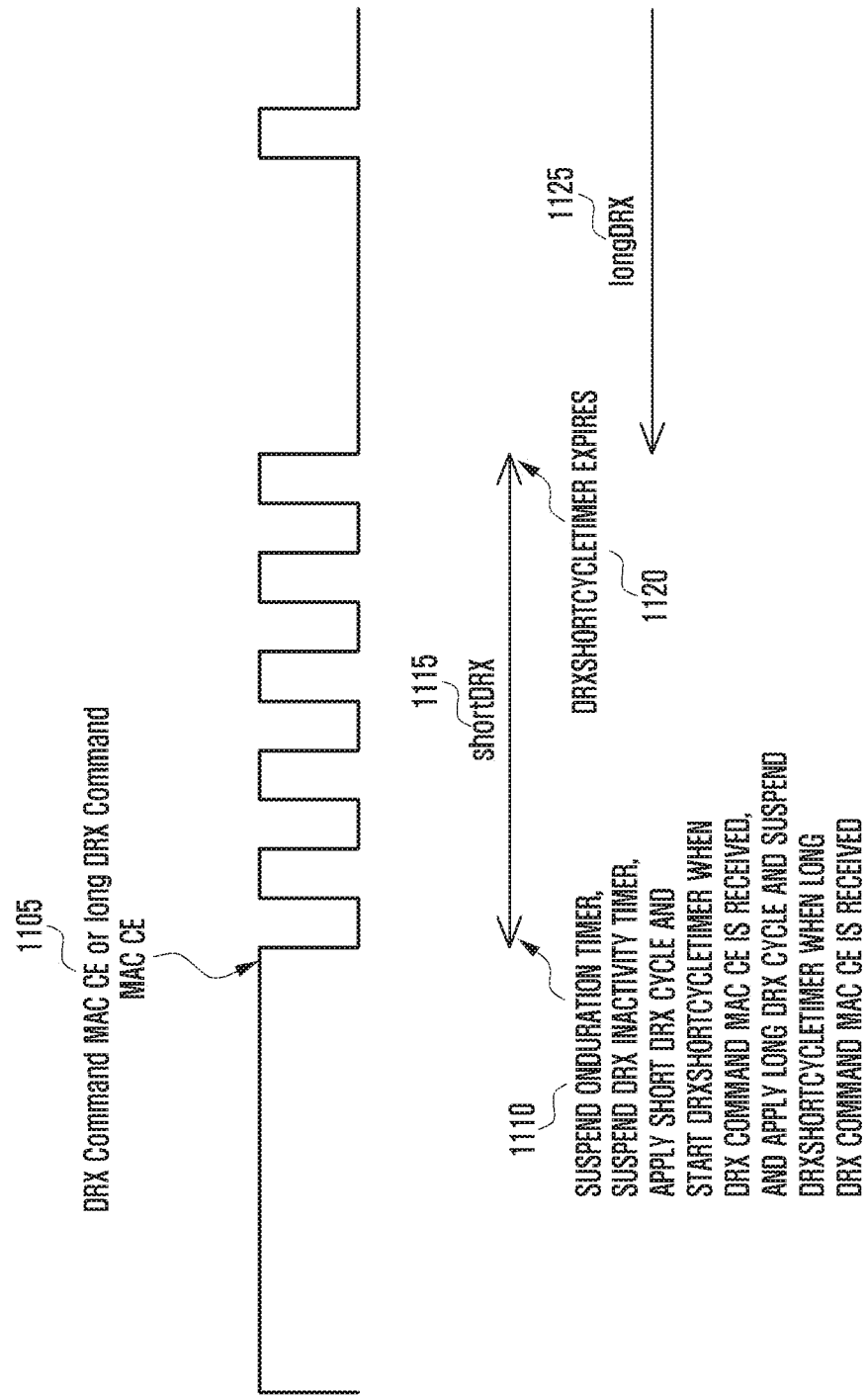
FIG. 11 is a diagram illustrating an operation in which two DRX cycles are applied after a DRX command MAC CE is received.

FIG. 11 is a diagram illustrating an operation in which two DRX cycles are applied after a DRX command MAC CE is received. According to the legacy LTE DRX operation, a network may change a long DRX cycle and a short DRX cycle applied to a terminal, using a DRX command MAC CE and a long DRX command MAC CE in operation 1105. When the terminal receives the DRX command MAC CE, the terminal applies a short DRX cycle, and when the terminal receives the long DRX command MAC CE, the terminal applies a long DRX cycle in operation 1110. When the terminal receives one of the two MAC CEs, the terminal may suspend an onDurationTimer and a drx-inactivity timer.

When the terminal receives the DRX command MAC CE, the terminal starts a drxshortCycleTimer and applies a short DRX cycle in operation 1115. When the drxShortCycleTimer expires in operation 1120, a long DRX cycle is applied 1125. When the terminal receives the Long DRX Command MAC CE, the terminal suspends the drxShortCycleTimer, and applies a long DRX cycle.

Figure 12:
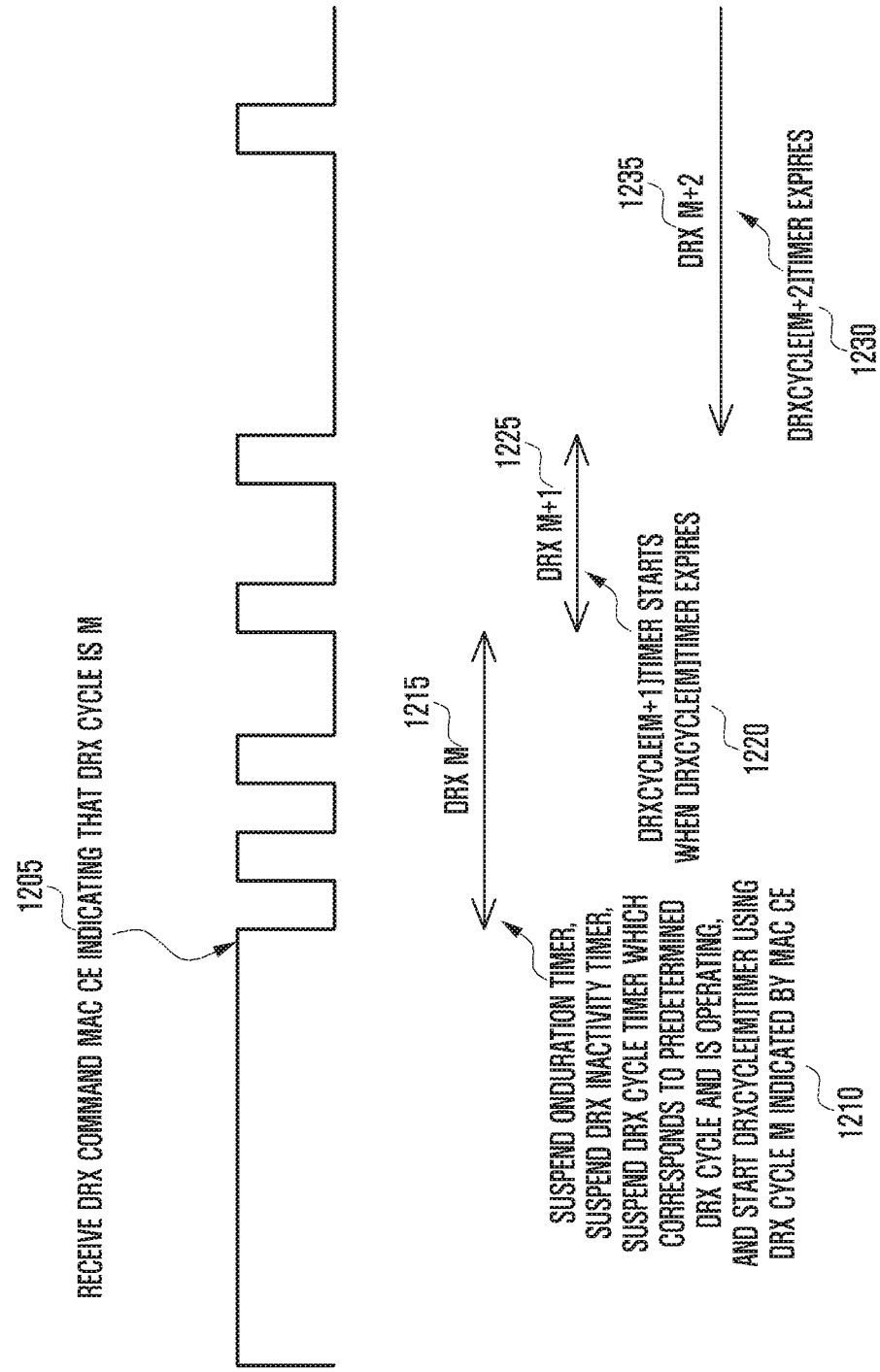
FIG. 12 is a diagram illustrating an operation in which a plurality of DRX cycles is applied after a DRX command MAC CE is received.

FIG. 12 is a diagram illustrating an operation in which a plurality of DRX cycles is applied after a DRX command MAC CE is received. In the disclosure, a network may direct a terminal to apply a DRX cycle M via a MAC CE in operation 1205. The terminal that receives the MAC CE may suspend an onDurationTimer and a drx-inactivityTimer. Also, the terminal may suspend a DRX cycle timer which corresponds to a predetermined DRX cycle and is operating. The terminal applies the DRX cycle M indicated by the MAC CE in operation 1215, and starts a timer corresponding thereto. When the drxCycle[M]Timer expires in operation 1220, the terminal applies a DRX cycle M+1, which is the shortest cycle excluding the DRX cycle M among the configured DRX cycles, in operation 1225, and starts a timer corresponding thereto. The operation is repeated until the longest DRX cycle among the configured DRX cycles is applied.

Figure 13:
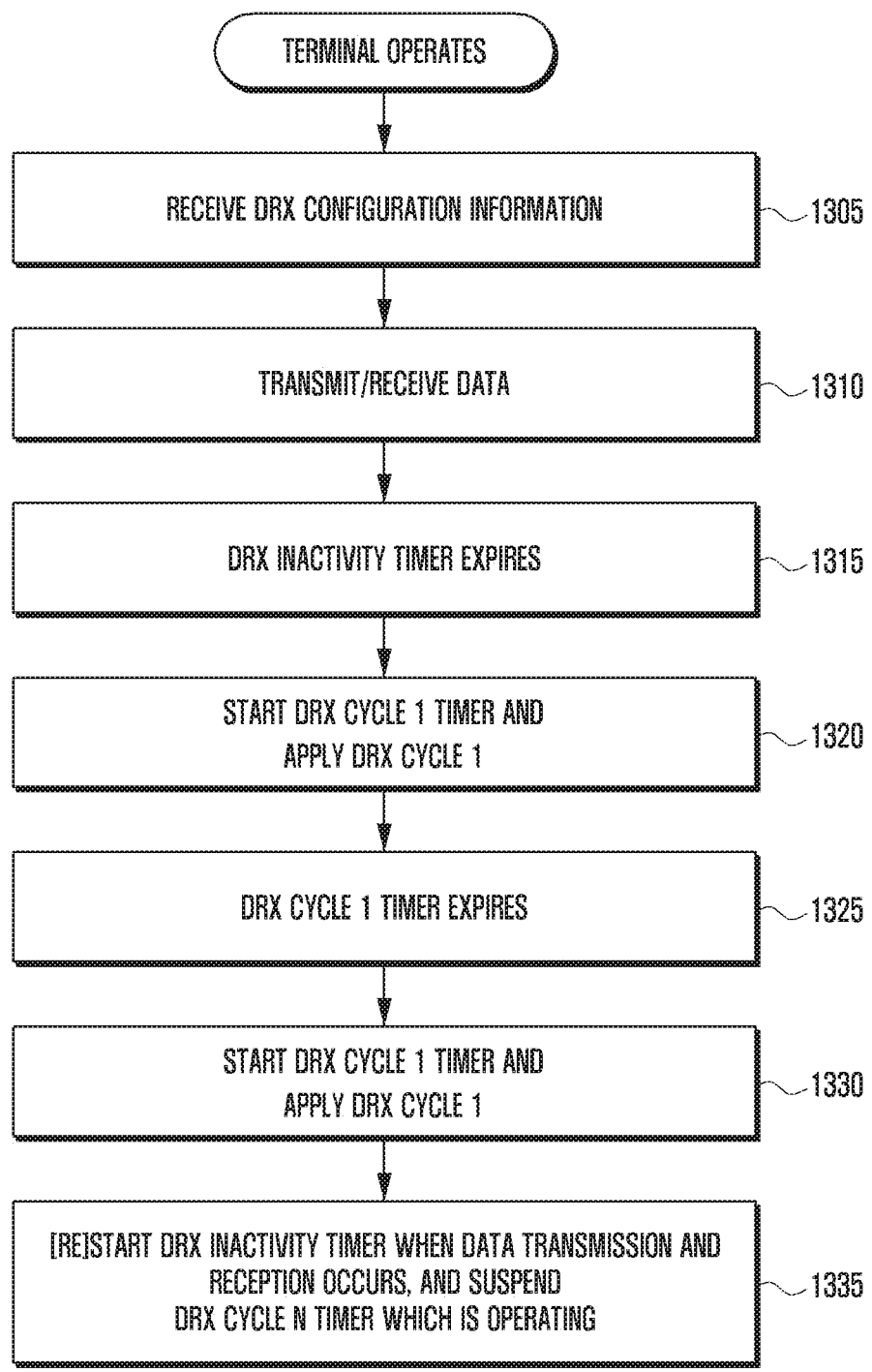
FIG. 13 is a diagram illustrating the operation of a terminal when a plurality of DRX cycles is applied.

FIG. 13 is a diagram illustrating the operation of a terminal when a plurality of DRX cycles is applied.

In operation 1305, the terminal receives DRX configuration information from a base station. The configuration information may include information specifying N DRX cycles, information specifying N−1 cycle change timer, and information associated with a drx-inactivitytimer. A cycle change timer which corresponds to each DRX cycle, excluding the longest DRX cycle, exists. The DRX configuration information may include at least one DRX cycle. While a cycle change timer operates, the terminal may apply a DRX cycle corresponding thereto.

In operation 1310, the terminal receives scheduling information from the base station, and performs data transmission and reception. When a drx-inactivity expires in operation 1315, the terminal starts a first cycle change timer and applies a first DRX cycle in operation 1320. The first DRX cycle is the shortest cycle among a plurality of DRX cycles provided by the DRX configuration information.

The first cycle change timer expires in operation 1325. The terminal starts a second cycle change timer and applies a second DRX cycle in operation 1330. Operations 1320, 1325, and 1330 may be applied until the longest DRX cycle is applied. While the operations are repeated, if data transmission and reception are performed, the terminal starts a drx-inactivity timer in operation 1335.

In this instance, the terminal suspends the $n^{th}$ cycle change timer, which is operating. When the drx-inactivity timer expires, and if a plurality of DRX cycles is configured, the terminal applies the shortest DRX cycle first and starts a corresponding cycle change timer. If only one DRX cycle is configured, when the drx-inactivity timer expires, the terminal applies the only one DRX cycle but does not operate a cycle change timer, since a cycle change timer is not configured.

The network may direct the terminal to apply one of the plurality of configured DRX cycles via a MAC CE. In this instance, the terminal may apply the directed DRX cycle, and starts a cycle change timer corresponding thereto. When the cycle change timer expires, the terminal may apply the shortest DRX cycle, excluding the directed DRX cycle. The operation is repeated until the longest DRX cycle is applied.

Figure 14:
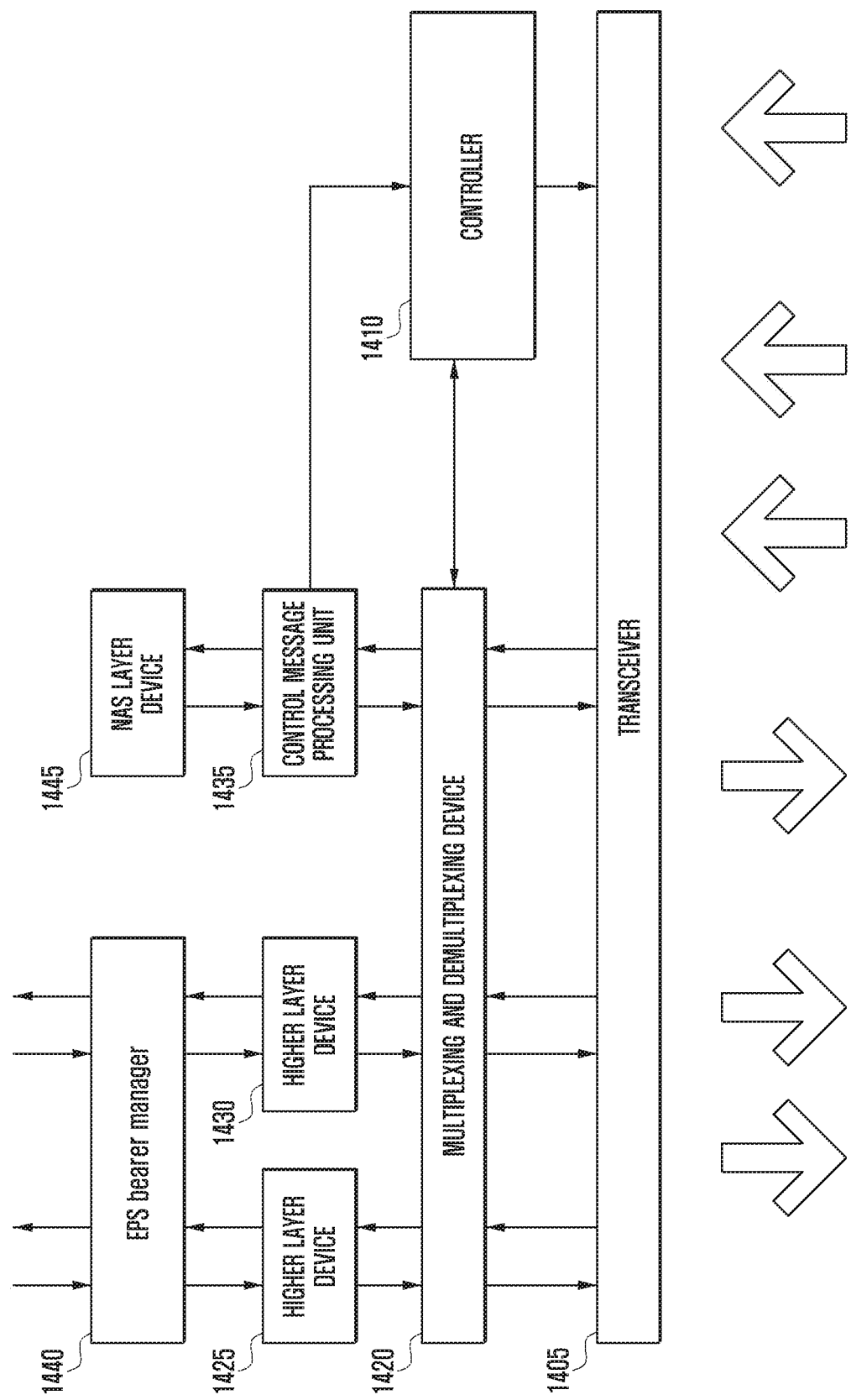
FIG. 14 is a block diagram illustrating the configuration of a terminal according to embodiments of the disclosure.

FIG. 14 is a block diagram illustrating the configuration of a terminal according to embodiments of the disclosure.

Referring to FIG. 14, a terminal according to an embodiment of the disclosure may include a transceiver 1405, a controller 1410, a multiplexing and demultiplexing unit 1415, a control message processing unit 1430, various higher layer processing units 1420 and 1425, an EPS bearer manger 1440, and an NAS layer device 1445.

The transceiver 1405 receives data and a predetermined control signal via a forward channel of a serving cell, and transmits data and a predetermined control signal via a backward channel. When a plurality of serving cells is configured, the transceiver 1405 transmits and receives data and a control signal via the plurality of serving cells.

The multiplexing and demultiplexing unit 1415 multiplexes data produced by the higher layer processing units 1420 and 1425 or the control message processing unit 1430, or demultiplexes data received by the transceiver 1405 so as to transmit the data to the suitable higher layer processing unit 1420 and 1425 or the control message processor 1430.

The control message processing unit 1430 may be an RRC layer device, and may process a control message received from a base station so as to perform a required operation. For example, when an RRC CONNECTION SETUP message is received, an SRB1 and a temporary DRB are configured.

The higher layer processing units 1420 and 1425 indicate DRB devices, and may be configured for each service type. Data produced from a user service, such as a file transfer protocol (FTP), a Voice over Internet protocol (VoIP), or the like, may be processed and transferred to the multiplexing and demultiplexing unit 1415, or data transferred from the multiplexing and demultiplexing unit 1415 may be processed and transferred to a service application of a higher layer. One service may be one to one mapped to one EPS bearer and one higher layer processing unit. When an EPS bearer uses data transfer procedure 2 (the first embodiment or the second embodiment) proposed in the disclosure, a higher layer processing unit may not be configured for the corresponding EPS bearer.

The controller 1410 identifies a scheduling command received via the transceiver 1405, for example, backward grants, and controls the transceiver 1405 and the multiplexing and demultiplexing unit 1415 so as to perform a backward transmission via a suitable transmission resource at an appropriate point in time.

The EPS bearer manager may determine whether to apply data transfer procedure 2, and when the EPS bearer manager determines to apply the data transfer procedure, the EPS bearer manager may transfer an IP packet to an RRC layer device or a temporary DRB device.

Figure 15:
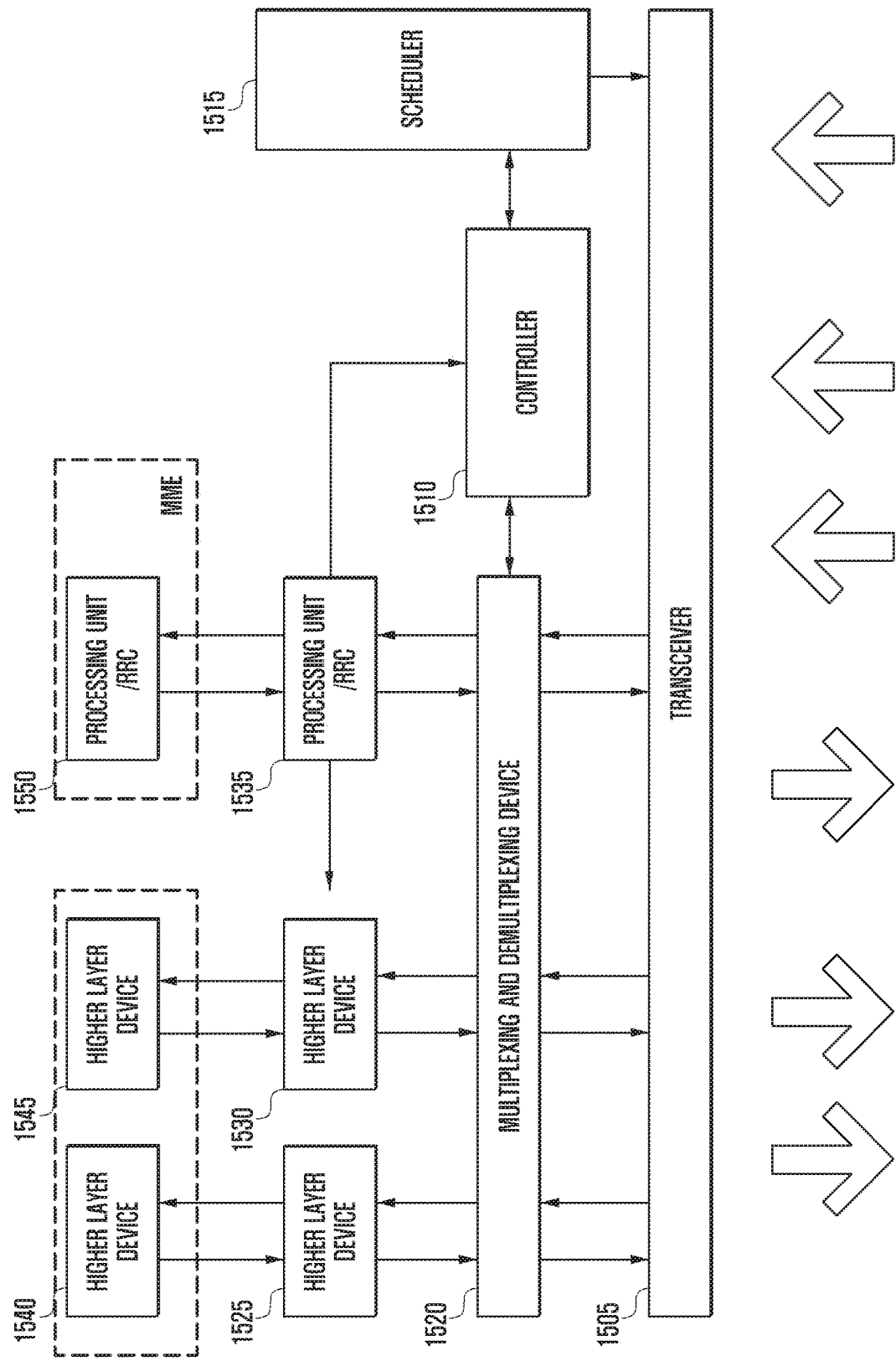
FIG. 15 is a block diagram illustrating the configuration of a base station, an MME, and an S-GW according to embodiments of the disclosure.

FIG. 15 is a block diagram illustrating the configurations of a base station, an MME, and an S-GW according to an embodiment of the disclosure. The base station device of FIG. 15 may include a transceiver 1505, a controller 1510, a multiplexing and demultiplexing unit 1520, a control message processing unit 1535, various higher layer processing units 1525 and 1530, a scheduler 1515, EPS bearer devices 1540 and 1545, and an NAS layer device 1550. The EPS bearer device is located in the S-GW, and an NAS layer device is located in the MME.

The transceiver 1505 transmits data and a predetermined control signal via a forward carrier and receives data and a predetermined control signal via a backward carrier. When a plurality of carriers is configured, the transceiver 1505 transmits and receives data and a control signal via the plurality of carriers.

The multiplexing and demultiplexing unit 1520 multiplexes data produced by the higher layer processing units 1525 and 1530 or the control message processing unit 1535, or demultiplexes data received by the transceiver 1505 so as to transfer the data to the appropriate higher layer processing units 1525 and 1530, the control message processing unit 1535, or the controller 1510. The control message processing unit 1535 may process a control message transmitted by the terminal so as to perform a required operation, or may produce a control message to be transmitted to the terminal and transfer the same to a lower layer.

The higher layer processing unit 1525 or 1530 may be configured for each EPS bearer, may configure data transferred from an EPS bearer device to be an RLC PDU so as to transfer the RLC PDU to the multiplexing and demultiplexing unit 1520, or may configure an RLC PDU transferred from the multiplexing and demultiplexing unit 1520 to be a PDCP SDU so as to transfer the PDCP SDU to an EPS bearer device.

By taking into consideration a buffer state, a channel state, or the like of the terminal, the scheduler may allocate a transmission resource to the terminal at a suitable point in time, and may perform processing such that the transceiver processes a signal transmitted by the terminal or transmits a signal to the terminal.

The EPS bearer device is configured for each EPS bearer, and may process data transferred from a higher layer processing unit so as to transfer the same to a subsequent network node.

A higher layer processing unit and an EPS bearer device may be connected to each other via an S1-U bearer. A higher layer processing unit which corresponds to a common DRB may be connected to an EPS bearer for a common DRB via a common S1-U bearer.

The NAS layer device may process an IP packet included in an NAS message, and may transfer the same to the S-GW.

According to an embodiment, a control message directing configuration of a PDCP entity is received from a base station. The control message may include first information associated with a PDCP transmission configuration and second information associated with a PDCP reception configuration, and a PDCP entity may be configured according to the configuration information.

Also, when the first information of the PDCP transmission configuration is a first value, a COUNT is included in the header of a PDCP PDU and is transmitted. When the first information of the PDCP transmission configuration is a second value, a part of a COUNT is included in the header in a PDCP PDU and is transmitted. When the second information of the PDCP reception configuration is the first value, a PDCP PDU is processed by applying the first method. When the second information of the PDCP reception configuration is the second value, a PDCP PDU is processed by applying the second method.

The first information is information indicating the length of a PDCP SN. The first value is a value for configuring the length of a PDCP SN to be the same as the length of a COUNT. The second value is a value for configuring the length of a PDCP SN to be different from the length of a COUNT.

The first method is a method of decoding a PDCP PDU using the SN of a received PDCP PDU as a COUNT. The second method is a method of decoding a PDCP PDU by using the SN of a received PDCP PDU as a part of a COUNT. When the first method is applied, a COUNT is determined from the PDCP SN without performing a process of determining an HFN for the received PDCP PDU. When the second method is applied, a COUNT is determined by determining an HFN based on the SN of the received PDCP PDU and connecting the HFN and the PDCP SN.

Also, according to another embodiment, control information directing DRX configuration is received from a base station. The control message includes information specifying N DRX cycles, information specifying N−1 cycle change timers, and information associated with an inactivity timer.

Scheduling information is received from the base station. Data transmission and reception is performed. When an inactivity timer expires, a first cycle change timer is started, and a first DRX cycle is applied. When the first cycle change timer expires, a second cycle change timer is started, and a second DRX cycle is applied. When an N−2$^{th}$ cycle change timer expires, an N−1$^{th}$ cycle change timer is started, and an N−1$^{th}$ DRX cycle is applied. When the N−1$^{th}$ cycle change timer expires, an N$^{th}$ DRX cycle is applied.

The inactivity timer starts or restarts when control information indicating transmission and reception of new data is received, and a cycle change timer is suspended when the inactivity timer starts.

The invention claimed is:

1. A method by a terminal for processing a packet in a wireless communication system, the method comprising:
   receiving, from a base station, configuration information for packet processing including information associated with a logical channel of the packet;
   determining a count value (COUNT) for processing a packet to be transmitted to the base station as a first count value or a second count value, based on the configuration information; and
   processing the packet based on the determined COUNT,
   wherein a length of the determined COUNT is same as a length of a packet data convergence protocol sequence number (PDCP SN) of the terminal, in case that the determined COUNT is the first count value, and
   wherein the length of the determined COUNT is longer than the length of the PDCP SN of the terminal, in case that the determined COUNT is the second count value.

2. The method of claim 1, wherein the second count value is determined based on the PDCP SN of the terminal and a hyper frame number (HFN) of the terminal.

3. The method of claim 1, further comprising:
   determining the first count value as the COUNT for processing the packet, in case that the packet is determined to be a packet for a signaling radio bearer (SRB) or a packet for a voice over internet protocol (VoIP), based on the information associated with the logical channel of the packet.

4. The method of claim 1, wherein the determining the count value comprises: determining the first count value as the COUNT for processing the packet, in case that a size of the packet exceeds a predetermined reference value; and determining the second count value as the COUNT for processing the packet, in case that the size of the packet is less than or equal to the reference value.

5. The method of claim 1, wherein the processing the packet comprises: performing an integrity protection operation for the packet and ciphering the packet, based on the determined COUNT.

6. A method by a terminal for processing a packet in a wireless communication system, the method comprising:
   receiving, from a base station, a packet and configuration information for packet processing including information associated with a logical channel of the packet;
   determining a count value (COUNT) for processing the packet as a first count value or a second count value based on the configuration information; and
   processing the packet based on the determined COUNT,
   wherein a length of the determined COUNT is same as a length of a packet data convergence protocol sequence number (PDCP SN) of the terminal, in case that the determined COUNT is the first count value, and
   wherein the length of the determined COUNT is longer than the length of the PDCP SN of the terminal, in case that the determined COUNT is the second count value.

7. The method of in claim 6, wherein the determining the COUNT further comprises:
   determining the COUNT based on the length of the PDCP SN of the terminal, in case that the determined COUNT is the first count value; and
   determining the COUNT based on the length of the PDCP SN of the terminal and a hyper frame number (HFN) of the terminal, in case that the determined COUNT is the second count value.

8. The method of claim 6, wherein the processing the packet comprises: performing an integrity verification operation for the packet and deciphering the packet, based on the determined COUNT.

9. A terminal in a wireless communication system, the terminal comprising:
   a transceiver configured to transmit and receive a signal; and
   a controller configured to:
     control the transceiver to receive, from a base station, configuration information for packet processing including information associated with a logical channel of the packet,
     determine a count value (COUNT) for processing a packet to be transmitted to the base station as a first count value or a second count value, based on the configuration information, and process the packet based on the determined COUNT, wherein a length of the determined COUNT is the same as a length of a packet data convergence protocol sequence number (PDCP SN) of the terminal, in case that the determined COUNT is the first count value, and wherein the length of the determined COUNT is longer than the length of the PDCP SN of the terminal, in case that the determined COUNT is the second count value.

10. The terminal of claim 9, wherein the controller is further configured to determine the first count value as the COUNT for processing the packet, in case that the packet is determined to be a packet for a signaling radio bearer (SRB) or a packet for a voice over internet protocol (VoIP), based on the information associated with the logical channel of the packet.

11. The terminal of claimer 10, wherein the controller is further configured to determine the first count value as the COUNT for processing the packet when a size of the packet exceeds a predetermined reference value, and determine the second count value as the COUNT for processing the packet when a size of the packet is less than or equal to the reference value.

12. A terminal in a wireless communication system, the terminal comprising:

a transceiver configured to transmit and receive a signal; and a controller configured to:

control the transceiver to receive, from a base station, a packet and configuration information for packet processing including information associated with a logical channel of the packet, determine a count value (COUNT) for processing the packet as a first count value or a second count value based on the configuration information, and process the packet based on the determined COUNT, wherein a length of the determined COUNT is the same as a length of a packet data convergence protocol sequence number (PDCP SN) of the terminal, in case that the determined COUNT is the first count value, and wherein the length of the determined COUNT is longer than the length of the PDCP SN of the terminal, in case that the determined COUNT is the second count value.

13. The terminal of claim 12, wherein the controller is further configured to:

determine the COUNT based on the length of the PDCP SN of the terminal, in case that the determined COUNT is the first count value, and determine the COUNT based on the length of the PDCP SN of the terminal and a hyper frame number (HFN) of the terminal, in case that the determined COUNT is the second count value.

\* \* \* \* \*